United States Patent [19]

Stein

[11] Patent Number: 5,046,809
[45] Date of Patent: Sep. 10, 1991

[54] COUPLING ARRANGEMENT FOR OPTICALLY COUPLING A FIBER TO A PLANAR OPTICAL WAVEGUIDE INTEGRATED ON A SUBSTRATE

[75] Inventor: Karl-Ulrich Stein, Unterhaching, Fed. Rep. of Germany

[73] Assignee: Siemens Aktiengesellschaft, Munich, Fed. Rep. of Germany

[21] Appl. No.: 584,171

[22] Filed: Sep. 18, 1990

[30] Foreign Application Priority Data

Sep. 29, 1989 [DE] Fed. Rep. of Germany ....... 3932688

[51] Int. Cl.$^5$ .................................................. G02B 6/30
[52] U.S. Cl. ...................................... 385/49; 156/647; 156/656; 385/15; 385/95
[58] Field of Search ............... 350/96.17, 96.20, 96.21, 350/96.15, 320, 96.11, 96.12; 156/647, 656; 204/192.35

[56] References Cited

U.S. PATENT DOCUMENTS

| | | | |
|---|---|---|---|
| 4,210,923 | 7/1980 | North et al. | 350/96.17 |
| 4,601,535 | 7/1986 | Tanaka et al. | 350/96.15 |
| 4,890,895 | 1/1990 | Zavraeky et al. | 350/96.20 |
| 4,892,377 | 1/1990 | Randle | 350/96.20 |
| 4,973,133 | 11/1990 | Matz et al., | 350/320 |

OTHER PUBLICATIONS

Optoelektronik Magazin, vol. 4, Nr. 6/7, 1988, S. 556 ff.

*Primary Examiner*—Georgia Epps
*Attorney, Agent, or Firm*—Hill, Van Santen, Steadman & Simpson

[57] ABSTRACT

In silicon micro mechanical units, a coupling arrangement for optically coupling a fiber to a planar optical waveguide integrated on a substrate. The coupling arrangement provides a fiber arranged in a V-shaped groove of the substrate, leading to the planar waveguide and terminating in a low-attenuation butt coupling between the fiber and the planar optical waveguide. The butt coupling achieves the low-attenuation without great outlay, and cost-beneficially. A further embodiment employs welding the fiber to the waveguide.

10 Claims, 1 Drawing Sheet

COUPLING ARRANGEMENT FOR OPTICALLY COUPLING A FIBER TO A PLANAR OPTICAL WAVEGUIDE INTEGRATED ON A SUBSTRATE

BACKGROUND OF THE INVENTION

The invention is directed to a coupling arrangement for optically coupling a fiber to a planar optical waveguide integrated on a substrate whereby a fiber having an end face is secured in a groove having a V-shaped profile, the groove is fashioned in the substrate, the fiber end face facing at an end face of the planar waveguide.

A coupling arrangement of the said species is disclosed by European Patent Application 89 116 456.8, corresponding U.S. application Ser. No. 406,599, U.S. Pat. No. 4,973,133. In this coupling arrangement, the end face of the planar waveguide is arranged in an end face of the groove having a V-shaped profile. This groove is produced such that two slot-shaped channels are etched into the substrate proceeding obliquely toward one another into the depth from the surface until they meet or cross and, as a result thereof, a bridge or tongue separated from the substrate by the channels arises, this being cleaved off, for example in an ultrasound bath.

Channels having a V-shaped profile can also be manufactured by anisotropic etching in suitable materials, for example in a silicon crystal having the orientation 100. Since, however, the end faces of such grooves due to the anisotropic etching are not vertical but are oblique relative to the longitudinal axis of the groove, a fiber introduced into such a groove can have its end face brought toward the end face of the planar waveguide arranged in or at the oblique end face of the groove, but a relatively large spacing results between the end face of the fiber and the end face of the planar waveguide, causes high coupling losses between these end faces of the fiber and of the planar waveguide.

SUMMARY OF THE INVENTION

It is an object of the invention to specify a coupling arrangement of the species initially cited that can be manufactured with anisotropic etching without great expense, and cost-beneficially, and whereby the end faces of the fiber and of the planar waveguide can nonetheless be brought into close contact with one another so that the coupling losses are low.

This object is achieved in that the end face of the planar waveguide is arranged at one end of a projection of the substrate that projects into a groove which holds a fiber therein, with an end face of the fiber abutting the end face of the planar waveguide.

This arrangement is self-aligning in that the core of the fiber in the arrangement of the invention can be fixed with high-precision in the directions transverse relative to the fiber. The coupling of the arrangement of the invention can be designed releasable on the basis of an appropriate clamp mechanism or, for example, can be designed fixed on the basis of fixing with plastic. On the basis of an appropriate design of the planar optical waveguide in terms of width and thickness, i.e., by matching to the core of the fiber, preferably a monomode fiber, attenuation values that lie in the area of 0.2 dP can be achieved with the arrangement of the invention that realizes a butt coupling.

Low attenuation of the arrangement of the invention can be further advantageously reduced by arranging an emersion agent between the end faces of the fiber and of the planar waveguide that are in intimate contact with one another.

For applications that do not call for butt coupling, the embodiment of the arrangement of the invention comprises a connection wherein the fiber and the planar waveguide are connected to one another by a fused connection.

It is particularly suited in the latter case to support the fiber in the groove with plastic. This plastic relieves stresses at the fused connection.

A simple and cost-beneficial method for manufacturing an arrangement of the invention is a method characterized in that a groove is etched into a substrate, the groove having a V-shaped profile and having an oblique end face having an oblique slope relative to the longitudinal axis of the groove as a result of anisotropic etching, and at such groove end face a waveguide end face of the planar waveguide is arranged. The groove is etched by anisotropic etching on a substrate of anisotropically etchable material having a planar optical waveguide integrated thereon. A projection of the substrate, holding the waveguide end face of the planar waveguide at its free end, is produced by isotropic etching a cavity at the oblique end face of the groove. Subsequently, a fiber is introduced into the groove such that a fiber end face is in intimate contact with the waveguide end face of the planar waveguide.

Additionally, the arrangement of the invention can be manufactured with a fused connection between the fiber and the planar waveguide. A welding technique recited therein is described in Optoelektronik-Magazin, Vol. 4, Nos. 6/7, 1988, pages 556-563. It uses a melting in an arc with which the planar waveguide is welded to the fiber advantageously controlled by a regulated positioning before and during the application of the arc.

Silicon can advantageously be employed as a anisotropically etchable material for the substrate in the method of the invention. Silicon having the orientation 100 is advantageous for forming the groove having the V-shaped profile into which the fiber can be placed, and also this groove can be advantageously produced with the method of the invention in a silicon chip that carries an opto-electronic integrated circuit while having this orientation 100.

The invention is set forth in greater detail by way of example in the following description with reference to the figures.

DETAILED DESCRIPTION OF THE PREFERRED EMBODIMENT

Figure 1:
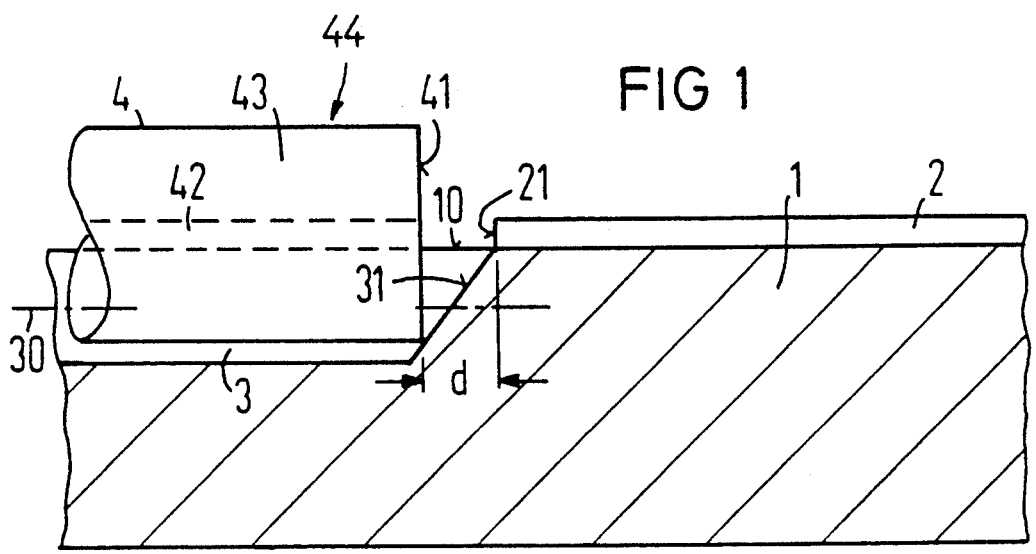
FIG. 1 is a schematic view of a section through a substrate having an integrated planar optical waveguide and having a groove with a V-shaped profile shown in longitudinally axial direction of the groove, whereby a fiber is placed into the groove.

A coupling arrangement is shown in FIG. 1 which demonstrates a problem encountered in the art. A substrate 1 with a groove etched therein anisotropically, having a V-shaped profile holds a fiber 44 having a core 42 surrounded by a cladding 43. A planar optical waveguide 2 mounted or integrated with the substrate 1 at a surface 10 thereof has a waveguide end face or end surface 21 facing the core 42. The planar waveguide 2 can be a strip-shaped waveguide proceeding in axial direction of the groove 3 and leading to an opto-electronic circuit integrated on the substrate 1 (not shown). Due to the anisotropic etching, the groove 3 has an oblique end face 31 that is arranged obliquely relative to the longitudinal axis 30 of the groove 3.

Due to the oblique end face 31 of the groove 3, a fiber 44 having core 42 and cladding 43 placed into this groove 3 cannot be brought entirely up against that end surface 21 of the planar waveguide 2 facing toward the groove 3 but an unavoidable, disturbing distance d remains between an end face 41 of the fiber 4 that faces toward the planar waveguide 2 and the end surface 21 of the planar waveguide 2, as shown in FIG. 1.

Figure 2:
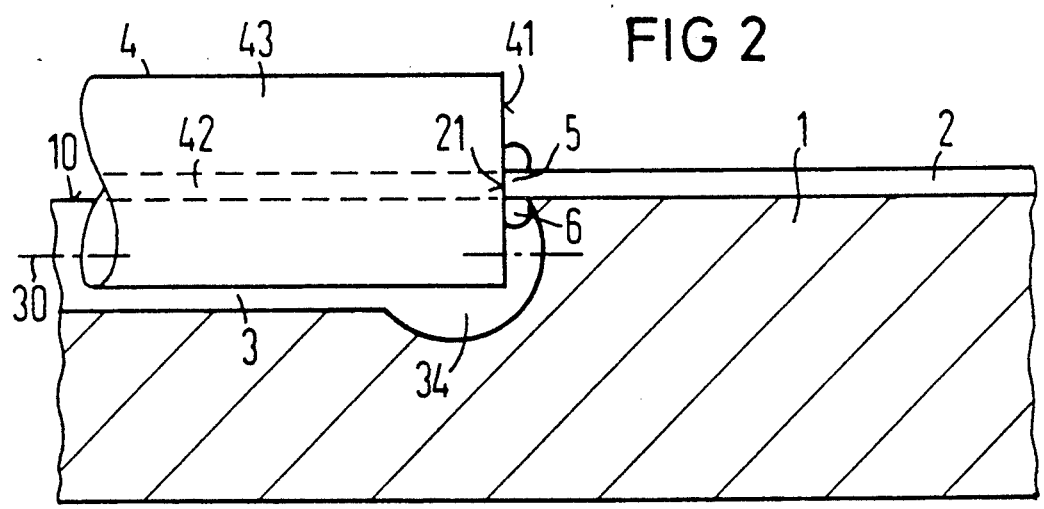
FIG. 2 is a schematic view of a section through a substrate having an integrated planar optical waveguide and having a groove with a V-shaped profile, with a cavity formed at a near end of the groove, whereby in an exemplary embodiment a butt coupling between the fiber placed into the groove and the planar waveguide occurs.
Figure 3:
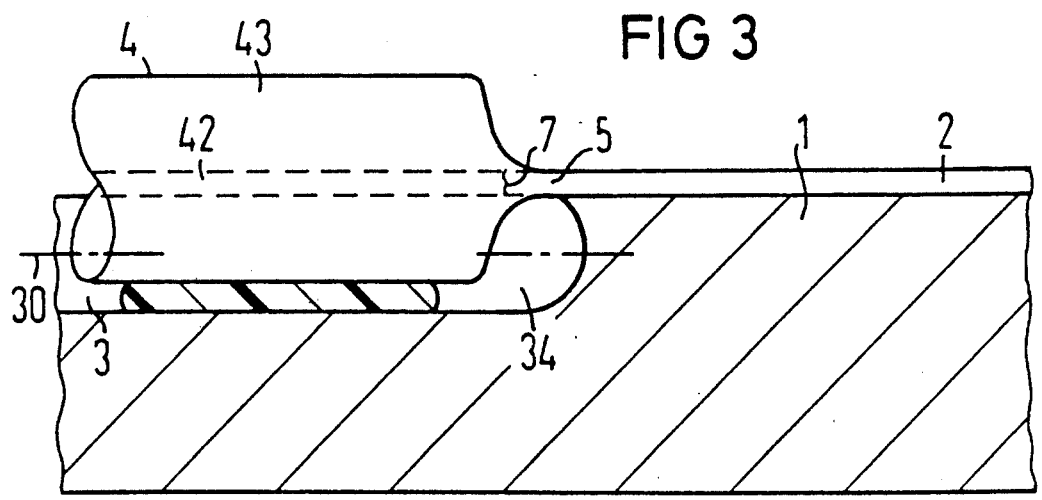
FIG. 3 is a schematic view of a section through a substrate having an integrated planar optical waveguide and having a groove with a V-shaped profile, with a cavity located at the near end of the groove, and whereby the fiber placed into the groove and the planar waveguide are welded together.

The coupling arrangements shown in FIGS. 2 and 3 are manufactured, for example, in the following way: a groove 3 having a V-shaped profile is etched by anisotropic etching in the surface 10 of the substrate 1 of silicon having the orientation 100 and having a planar optical waveguide 2 integrated at the surface 10 thereof. The planar waveguide 2 can be a strip-shaped waveguide proceeding in axial direction of the groove that leads to an opto-electronic circuit integrated on the substrate 1. This groove 3, due to the anisotropic etching, will have an end face 31 that is arranged obliquely relative to the longitudinal axis 30 of the groove 3 as shown in FIG. 1.

The disturbing distance d is inventively avoided in that the end surface 21 of the planar waveguide 2 is arranged at one end of a projection 5 of the substrate 1 that projects into the groove 3, whereby the end of the projection 5 can also be composed only of the end surface 21 of the planar waveguide 2. This projection 5 can be produced by isotropic etching of the substrate 1 at the oblique end face 31 of the groove 3, this producing a cavity or an end region 34 of the groove 3 in which the planar waveguide 2 is underetched or undercut at the end surface 21. By creating the projection 5, the fiber end face 41 of the fiber 4 placed into the groove 3 can be brought into close contact with the end surface 21 of the planar waveguide 2, as a result whereof a low-attenuation butt coupling is realized between the fiber 4 and the waveguide 2 which can be further improved by introducing an emersion agent 6, for example emersion oil, between the fiber end faces 41 and the end surface 21.

The other exemplary embodiment of FIG. 3 that can be manufactured in the same way as the embodiment of FIG. 2 differs from this latter embodiment essentially in that the fiber 4 and the waveguide 2 are fused to one another at the fiber end face 41 and the end surface 21, whereby a region 7 of the fused connection is shown in FIG. 3. This fused connection can be produced by the aforementioned, known method.

The fiber 4 placed into the groove 3 can be mechanically relieved, or supported by a plastic aid, for example by a plastic envelope. This measure is recommendable particularly in the embodiment of FIG. 3. This measure reduces mechanical stresses on the region 7 of the fused connection.

Although the present invention has been described with reference to a specific embodiment, those of skill in the art will recognize that changes may be made thereto without departing from the scope and spirit of the invention as set forth in the appended claims.

I claim as my invention:

1. A coupling arrangement for optically coupling a fiber to a planar optical waveguide comprising:
   a fiber having a fiber end face;
   a planar optical waveguide having an end surface for communicating with said fiber;
   a substrate having said planar optical waveguide integrated thereon, and having a V-shaped groove formed into a surface of said substrate, said fiber arranged axially supported inside said groove along a length of said groove, said substrate having a projection portion projecting into said groove, and said end surface of said planar optical waveguide faces said fiber end face of said fiber, said end surface arranged at a free end of said projection portion into said groove, the end surface in close contact with said fiber end face of said fiber.

2. A coupling arrangement according to claim 1, wherein said substrate has a cavity formed into said surface of said substrate at a longitudinal end of said groove, and said cavity open to said groove, said cavity undercutting said surface of said substrate at the longitudinal end of said groove forming said projection portion of said substrate, allowing said fiber to reside at least partially inside said cavity, with said fiber end face abutting said end surface.

3. A coupling arrangement according to claim 2, wherein said arrangement further comprises an emersion agent arranged between said fiber end face and said end surface.

4. A coupling arrangement according to claim 2, wherein said fiber end face and said end surface are connected to one another by a fused connection.

5. A coupling arrangement according to claim 4, wherein said arrangement further comprises a plastic support and said fiber is supported in the groove by said plastic support.

6. A method for manufacturing a coupling element to optically couple a fiber to a planar optical waveguide comprising the steps:
   provide a fiber having a fiber end face to communicate with said waveguide;
   provide a substrate with said planar optical waveguide integrated on a substrate surface of said substrate thereon;
   anisotropically etch a groove having an oblique groove end face arranged aligned at said substrate surface with a waveguide end surface of the planar optical waveguide;
   isotopically etch a cavity at the groove end face, undercutting the planar optical waveguide and causing said waveguide end surface to project into said cavity;
   insert said fiber longitudinally in said groove, said groove sized to accept said fiber with said fiber end face aligned with said waveguide end surface, and abutting said waveguide end surface.

7. A method according to claim 6, comprising the further step that said fiber end surface and said waveguide end face are welded to one another with a thermic welding technique.

8. A method according to claim 7, comprising the further step that said fiber is supported in said groove by a plastic envelope.

9. A method according to claim 6, wherein said substrate is composed of silicon.

10. A method according to claim 6, comprising the further step that an emersion agent is arranged between the waveguide end surface and the fiber end face.

* * * * *

UNITED STATES PATENT AND TRADEMARK OFFICE
CERTIFICATE OF CORRECTION

PATENT NO. : 5,046,809
DATED : September 10, 1991
INVENTOR(S) : Karl-Ulrich Stein It is certified that error appears in the above—identified patent and that said Letters Patent is hereby corrected as shown below:

At column 1, line 68 please replace "emersion" with --immersion--.

At column 3, line 55 please replace "emersion" with --immersion--.

At column 3, line 56 please replace "emersion" with --immersion--.

In claim 3, column 4, lines 37-38 please replace "emersion" with --immersion--.

In claim 10, column 6, line 4 please replace "emersion" with --immersion--.

Signed and Sealed this

Sixth Day of July, 1993

Attest:

MICHAEL K. KIRK

Attesting Officer

Acting Commissioner of Patents and Trademarks